United States Patent
Harris et al.

(10) Patent No.: US 11,584,426 B2
(45) Date of Patent: Feb. 21, 2023

(54) ROTATIONAL CENTERING DEVICE FOR STEERING COLUMN

(71) Applicant: STEERING SOLUTIONS IP HOLDING CORPORATION, Saginaw, MI (US)

(72) Inventors: Ryan D. Harris, Clio, MI (US); Jeremy A. Bonkowski, Freeland, MI (US); Laura F. Stock, Saginaw, MI (US); Joel A. Bickel, Millington, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 352 days.

(21) Appl. No.: 15/929,286

(22) Filed: Apr. 22, 2020

(65) Prior Publication Data
US 2020/0339182 A1 Oct. 29, 2020

Related U.S. Application Data

(60) Provisional application No. 62/838,123, filed on Apr. 24, 2019.

(51) Int. Cl.
*B62D 5/04* (2006.01)
*B62D 5/02* (2006.01)
*B62D 1/19* (2006.01)

(52) U.S. Cl.
CPC ........ *B62D 5/02* (2013.01); *B62D 1/19* (2013.01)

(58) Field of Classification Search
CPC ........ B62D 5/0466; B62D 5/006; B62D 5/02; B62D 1/19
See application file for complete search history.

(56) References Cited

U.S. PATENT DOCUMENTS

| 6,530,585 B1 | 3/2003 | Howard |
| 6,543,262 B2* | 4/2003 | Limburg ........... B60R 25/02153 70/252 |
| 6,688,645 B2* | 2/2004 | Andonian ............. B62D 5/001 180/6.26 |

(Continued)

FOREIGN PATENT DOCUMENTS

| CN | 108423059 A | 8/2018 |
| JP | H0747964 A | 2/1995 |
| JP | 2016117447 A * | 6/2016 |

OTHER PUBLICATIONS

Tashiro et al., Vehicle Steering Device, Jun. 30, 2016, JPO, JP 2016-117447 A, Machine Translation of Description (Year: 2016).*

(Continued)

*Primary Examiner* — James A English
(74) *Attorney, Agent, or Firm* — Dickinson Wright PLLC (57) ABSTRACT

A steering system includes a steering column for rotation between at least a center position and a range of second positions and defining a central axis. The steering system also includes an actuator assembly in operative communication with the steering column to provide steering assistance, the actuator assembly comprising a pair of plates, each plate including a first helical track and a second helical track. The steering system further includes a spring element arranged with the actuator assembly to bias movement of one of the pair of plates along the central axis to influence the steering column to move to the center position.

15 Claims, 8 Drawing Sheets

(56) References Cited

U.S. PATENT DOCUMENTS

| | | | |
|---|---|---|---|
| 7,878,843 B2 | 2/2011 | Zhang | |
| 8,813,901 B2 * | 8/2014 | Tashiro | B62D 5/001 |
| | | | 180/402 |
| 9,221,427 B2 * | 12/2015 | Bodtker | B60R 25/0215 |
| 2002/0189888 A1 * | 12/2002 | Magnus | B62D 5/006 |
| | | | 180/443 |
| 2003/0184072 A1 | 10/2003 | Linde et al. | |
| 2005/0138977 A1 * | 6/2005 | Suzuki | B60R 25/02153 |
| | | | 70/186 |
| 2006/0081409 A1 * | 4/2006 | Chikaraishi | B62D 5/006 |
| | | | 180/402 |
| 2010/0170364 A1 * | 7/2010 | Bertet | B62D 1/184 |
| | | | 74/495 |
| 2013/0253771 A1 * | 9/2013 | Hayama | B62D 5/003 |
| | | | 701/43 |
| 2018/0362079 A1 * | 12/2018 | Zuzelski | B62D 3/02 |
| 2020/0039575 A1 * | 2/2020 | Doornbos | F16D 3/10 |
| 2021/0245794 A1 * | 8/2021 | Kogure | B62D 6/008 |

OTHER PUBLICATIONS

English translation of First Office Action and Search Report regarding corresponding CN App No. 2020103316092; dated Mar. 23, 2022.

* cited by examiner

ROTATIONAL CENTERING DEVICE FOR STEERING COLUMN

CROSS-REFERENCE TO RELATED APPLICATION

This application claims priority to U.S. Provisional Patent Application Ser. No. 62/838,123, filed Apr. 24, 2019, the disclosure of which is incorporated herein by reference in its entirety.

BACKGROUND

A steering system may include an assembly to direct a set of wheels to be oriented in a center position relative to a vehicle central axis unless a steering input is applied to a steering wheel in mechanical communication with the set of wheels. Absent or following the steering input, the assembly may assist in returning the set of wheels to the center position. The assembly may include an electric actuator to facilitate returning the steering wheel to the center position. However, in a scenario involving an electrical failure, the electric actuator does not operate to return the steering wheel to the center position.

SUMMARY OF THE DISCLOSURE

According to one aspect of the disclosure, a steering system includes a steering column for orientation in at least a center position and a second position and defining a central axis. The steering system also includes an actuator assembly in operative communication with the steering column to provide steering assistance, the actuator assembly including a pair of plates, each plate defining an aperture for the steering column to extend therethrough and each plate including an outer track and an inner track disposed radially inward of the outer track relative to the central axis. The steering system further includes a first ball for disposal within the outer tracks. The steering system yet further includes a second ball for disposal within the inner tracks, the pair of plates arranged such that the outer tracks and the inner tracks of each of the pair of plates face one another. The steering system also includes a spring element arranged with the actuator assembly to bias movement of the second plate in an axial direction along the central axis. Each of the outer tracks and each of the inner tracks define a ramp region, with each of the ramp regions arranged with the spring element to influence a rotation of the steering column to return to the center position.

According to another aspect of the disclosure, a steering system including a steering column for orientation in at least a center position and a second position and defining a central axis. The steering system also includes an actuator assembly in operative communication with the steering column to provide steering assistance, the actuator assembly comprising at least three plates defined by a first end plate, a second end plate and at least one intermediate plate, each of the plates defining an aperture for the steering column to extend therethrough, wherein each adjacent set of plates includes a respective outer track facing each other and a respective inner track facing each other disposed radially inward of the outer track relative to the central axis. The steering system further includes an outer ball disposed within each of the respective outer tracks of each adjacent set of plates. The steering system yet further includes an inner ball disposed within each of the respective inner tracks of each adjacent set of plates. The steering system also includes a spring element arranged with the actuator assembly to bias movement of the second end plate in an axial direction along the central axis. Each of the outer tracks and each of the inner tracks define a ramp region, with each of the ramp regions arranged with the spring element to influence a rotation of the steering column to return to the center position.

According to another aspect of the disclosure, a steering system includes a steering column for rotation between at least a center position and a range of second positions and defining a central axis. The steering system also includes an actuator assembly in operative communication with the steering column to provide steering assistance, the actuator assembly comprising a pair of plates, each plate including a first helical track and a second helical track. The steering system further includes a spring element arranged with the actuator assembly to bias movement of one of the pair of plates along the central axis to influence the steering column to move to the center position.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
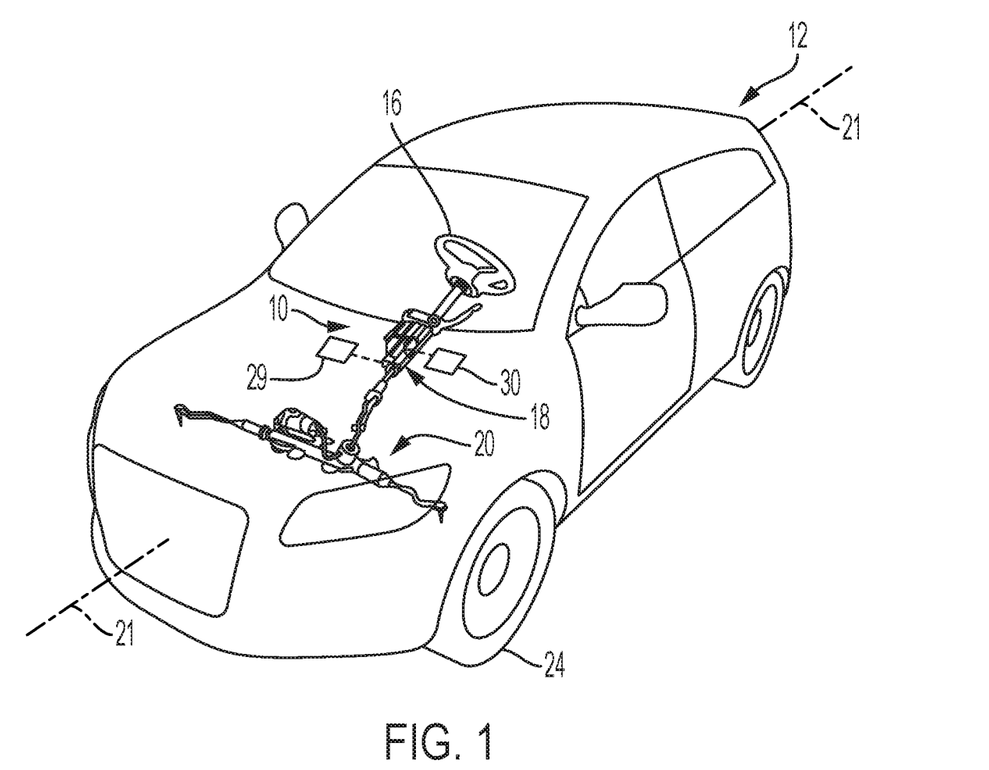
FIG. 1 is an illustrative perspective view of an example of a vehicle showing portions of an example of a steering system.

Referring now to the Figures, where the invention will be described with reference to specific embodiments, without limiting same, FIG. 1 illustrates an example of a steering assembly, referred to generally as a steering assembly 10 herein. The steering assembly 10 is shown disposed within a vehicle 12 in FIG. 1. The steering assembly 10 may assist in converting user inputs from a steering wheel 16 to direct movement of the vehicle 12. In this example, the vehicle 12 is a car, however, it is contemplated that the steering assembly 10 may be used to assist in steering other types of vehicles such as trucks, boats, aircraft, or other similar vehicles without departing from a scope of the present disclosure.

The steering assembly 10 may include the steering wheel 16 rotatably secured to an electric power steering assembly 18. The steering wheel 16 may be secured to a column assembly of the steering assembly 10 for rotation. The electric power steering assembly 18 may be operatively connected to a rack and pinion system 20 or a steer-by-wire system (not shown). The steering wheel 16, the electric power steering assembly 18, and the rack and pinion system 20 may be arranged with one another to direct movement of a front set of wheels 24 (only one front wheel 24 is shown in FIG. 1) of the vehicle 12 based on a driver's input. For example, the rack and pinion system 20 may be operatively connected to each of the front set of wheels 24 via knuckles and tie rods to convey driver input from the steering wheel 16 for movement of each of the front set of wheels 24. The vehicle 12 may define a central vehicle axis 21. A center position of the front set of wheels 24 may be defined by each of the front set of wheels 24 being oriented substantially parallel to the central vehicle axis 21.

The steering assembly 10 may be in communication with a controller 29. The controller 29 may include programming to direct operation of components of the steering assembly 10 and/or to direct operation of other vehicle 12 components. The programming, for example, may trigger an output of one or more vehicle operation commands based on received signals or detected vehicle conditions. The steering wheel 16 may include an airbag assembly therein and the controller 29 may include programming to direct operation of the airbag assembly.

Optionally, the steering assembly 10 may be in communication with a self-steering unit 30, such as an advanced driver assistance system or the like. The self-steering unit 30 may include programming to direct movement of the vehicle 12 without driver input to the steering wheel 16.

Figure 2:
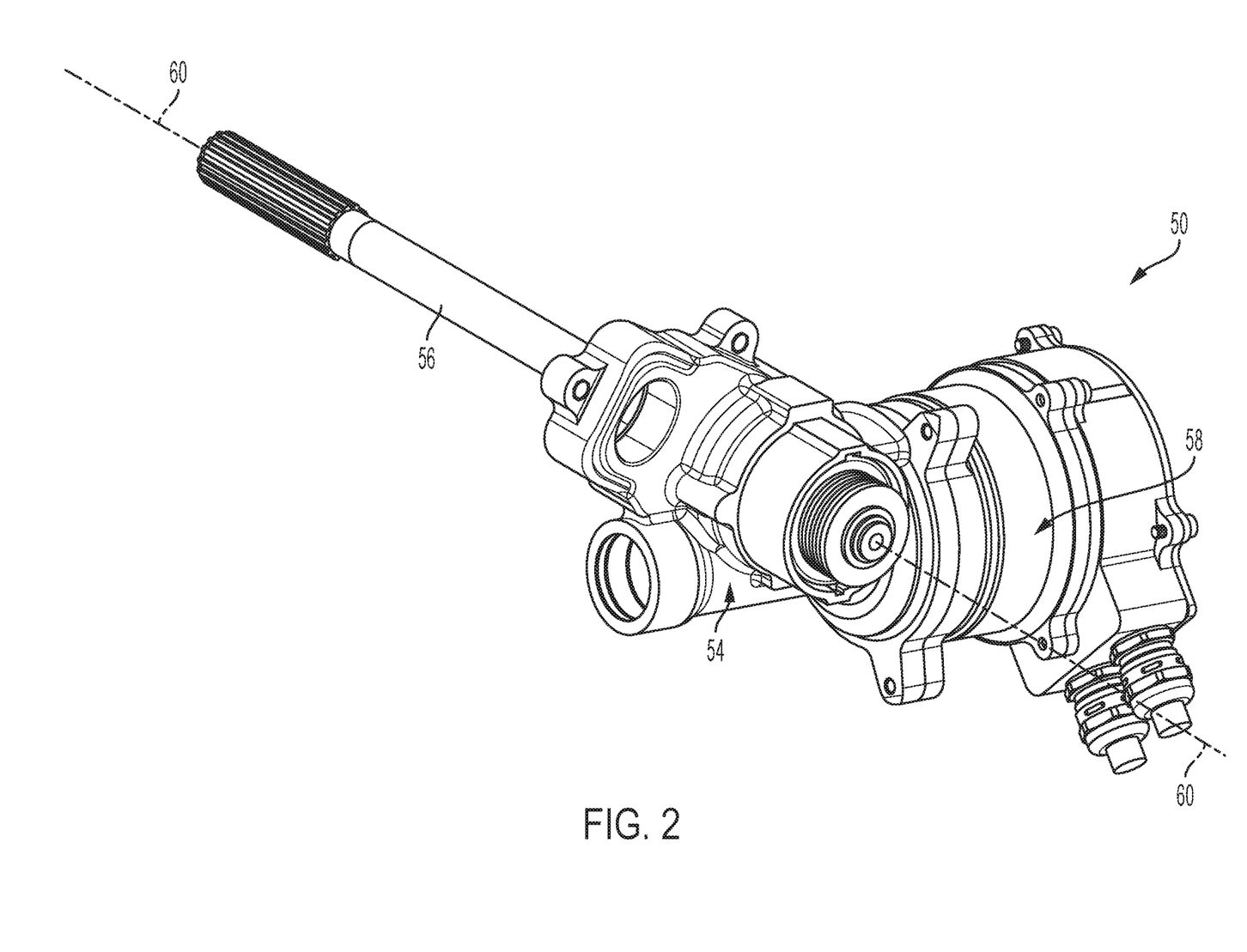
FIG. 2 is a perspective view illustrating an example of a column assembly for a steering system.
Figure 3A:
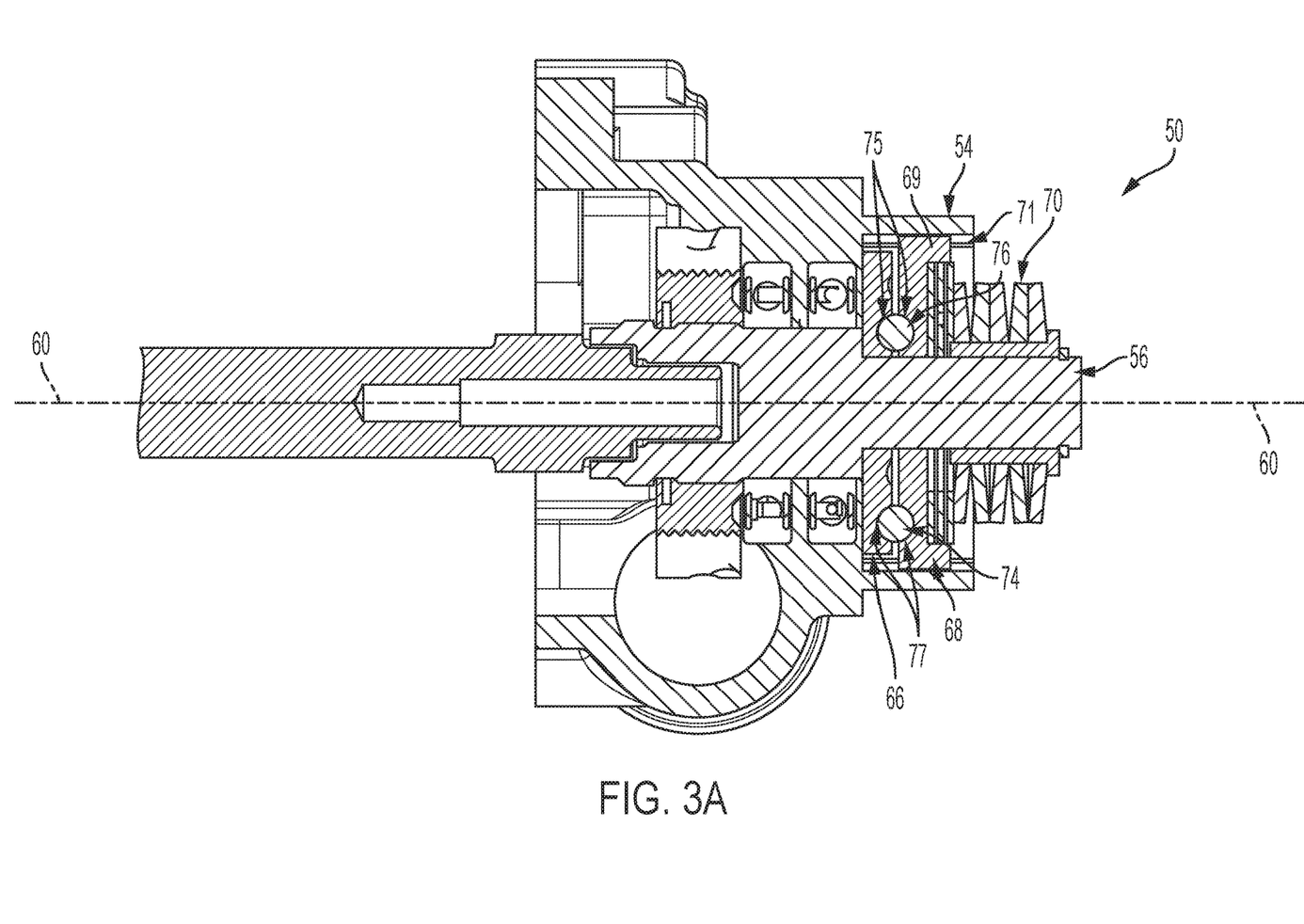
FIG. 3A is a side view, in cross-section, illustrating an example of a portion of the column assembly of FIG. 2.
Figure 3B:
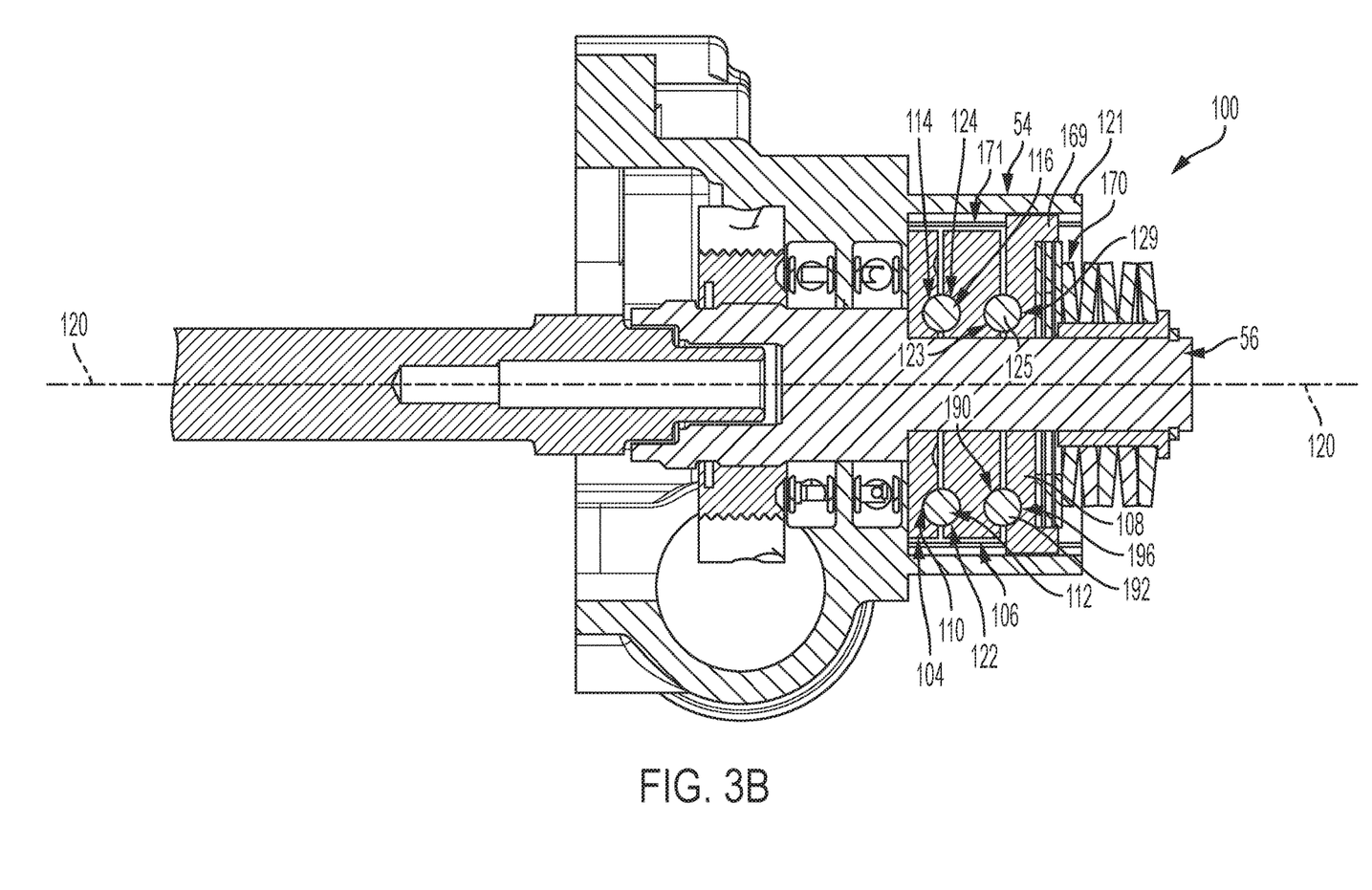
FIG. 3B is a side view, in cross-section, illustrating an example of a portion of the column assembly.

FIGS. 2, 3A and 3B illustrate portions of an example of a column assembly for a steering system. FIG. 2 is a perspective view of an example of a portion of a column assembly, referred to generally as a column assembly 50 herein. The column assembly 50 may operate with a steering assembly, such as the steering assembly 10 described above, to influence movement of the steering wheel 16. The column assembly 50 may also be used in a steer-by-wire system for a vehicle.

FIG. 3A is a side view, in cross-section, of a portion of the column assembly 50. The column assembly 50 may include an actuator assembly 54, a steering column 56, and a motor assembly 58. The actuator assembly 54 may be mechanically coupled to the steering column 56 for synchronous rotation about a column axis 60 defined by the steering column 56. A steering wheel (not shown) may be mounted to the steering column 56 such that actuator assembly 54 may at least partially direct rotation of the steering wheel between at least a first position and a second position. The first position may also be referred to as a center position herein. The motor assembly 58 may include a motor (not shown) in operative communication with the actuator assembly 54 to direct rotational movement of the steering column 56 based on received commands.

The actuator assembly 54 may include a first plate 66, a second plate 68, and a spring element 70 (best shown in FIG. 3A). In this example, the spring element 70 is an arrangement of disc springs, however it is contemplated that other types of springs (e.g., coil spring) may be used without departing from a scope of the present disclosure. The spring element 70 may be arranged with the first plate 66 and the second plate 68 to bias plate movement which in turn may bias rotation of the steering column 56. For example, the second plate 68 may be mounted for axial translation along the column axis 60 based on a bias of the spring element 70 and rotationally fixed. In the illustrated embodiments, the second plate 68 is in contact with the spring element 70 and is positioned for axial translation. The second plate 68 is rotationally fixed with a pair of protrusions 69 that extend into respective keyways 71 defined by the actuator assembly 54 housing. In some embodiments, the pair of protrusions 69 are spaced from each other by approximately 180 degrees, but alternative spacing is contemplated. Additionally, more (i.e., greater than 2) or fewer (i.e., a single) protrusions may be utilized in alternative embodiments. The first plate 66 is axially fixed to prevent axial translation while rotating with the steering column 56. In the illustrated embodiment, the first plate 66 is the plate axially fixed. The steering column 56 may be secured to one of the first plate 66 or the second plate 68 to facilitate synchronous movement thereof.

Each of the first plate 66 and the second plate 68 may define a pair of tracks sized to receive a track ball. For example, a first ball 74 may be sized for disposal within inner tracks 75 of each of the first plate 66 and the second plate 68 and a second ball 76 may be sized for disposal within outer tracks 77 of each of the first plate 66 and the second plate 68. The first ball 74, the second ball 76, and the pairs of tracks may be arranged with the spring element 70 to bias rotation of the steering column 56 to return to a center position from another position as further described herein.

FIG. 3B illustrates another example of a portion of a column assembly for a steering system, referred to generally as a column assembly 100 herein. The column assembly 100 may assist in providing a torque to return a steering wheel operatively connected to the column assembly 100 to a center position. The center position may correspond to a position in which a set of wheels operatively connected to the column assembly 100 are oriented in parallel with a vehicle central axis.

The column assembly 100 may include a first plate 104 stacked with a second plate 106 and a third plate 108. The plates may be arranged with one another such that operation thereof may generate a torque to influence a steering wheel to move to the center position from a position off-center. For example, the plates may each include tracks to receive one or more track balls. The first plate 104 may include a first outer track 110 sized to receive a first track ball 112. The first plate 104 may further include a first inner track 114 sized to receive a second track ball 116.

The first plate 104, the second plate 106 and the third plate 108 may be oriented about a column axis 120 defined by a housing 121 such that a second outer track 122 of the second plate 106 aligns with the first outer track 110 and a second inner track 124 of the second plate 106 aligns with the inner track 114. It is also contemplated that the steering column 56 may define the column axis 120.

The second plate 106 may define one or more additional ball tracks on a side of the second plate 106 opposite the second outer track 122 and the second inner track 124. In the illustrated embodiment, two additional tracks are provided. These additional tracks provide additional rotational travel for the column assembly 100. For example, a third inner track 123 may be defined by the second plate 106 and sized to receive a third track ball 125. A third outer track 190 may be defined by the second plate 106 and sized to receive a fourth track ball 192. The third plate 108 defines a fourth inner track 129 oriented to align with the third inner track 123 to receive the third track ball 125 therebetween. The third plate 108 also defines a fourth outer track 196 oriented to align with the third outer track 190 to receive the fourth track ball 192 therebetween.

A spring element 170 may be arranged with the first plate 104, the second plate 106 and the third plate 108 to bias plate movement that in turn may bias rotation of the steering column 56. In this example, the spring element 170 is an arrangement of, however it is contemplated that other types of springs (e.g., coil spring) may be used without departing from a scope of the present disclosure.

The spring element 170 may be arranged with the first plate 104, the second plate 106 and the third plate 108 to bias plate movement that in turn may bias rotation of the steering column 56. In the illustrated embodiment, the third plate 108 is mounted for axial translation along the column axis 60 based on a bias of the spring element 170 and rotationally fixed. In the illustrated embodiments, the third plate 108 is in contact with the spring element 170 and is positioned for axial translation. The third plate 108 is rotationally fixed with a pair of protrusions 169 that extend into respective keyways 171 defined by the actuator assembly 54 housing. In some embodiments, the pair of protrusions 169 are spaced from each other by approximately 180 degrees, but alternative spacing is contemplated. Additionally, more (i.e., greater than 2) or fewer (i.e., a single) protrusions may be utilized in alternative embodiments. The first plate 104 is axially fixed to prevent axial translation while allowing for rotation about the column axis 120. The second plate 106 is free to translate axially and free to rotate. In other words, the second plate 106 "floats" between the first plate 104 and the third plate 108.

The tracks of the first plate 104, the tracks of the second plate 106, and the third plate 108 arranged with one another to influence rotational movement of a steering wheel toward the center position.

Figure 4:
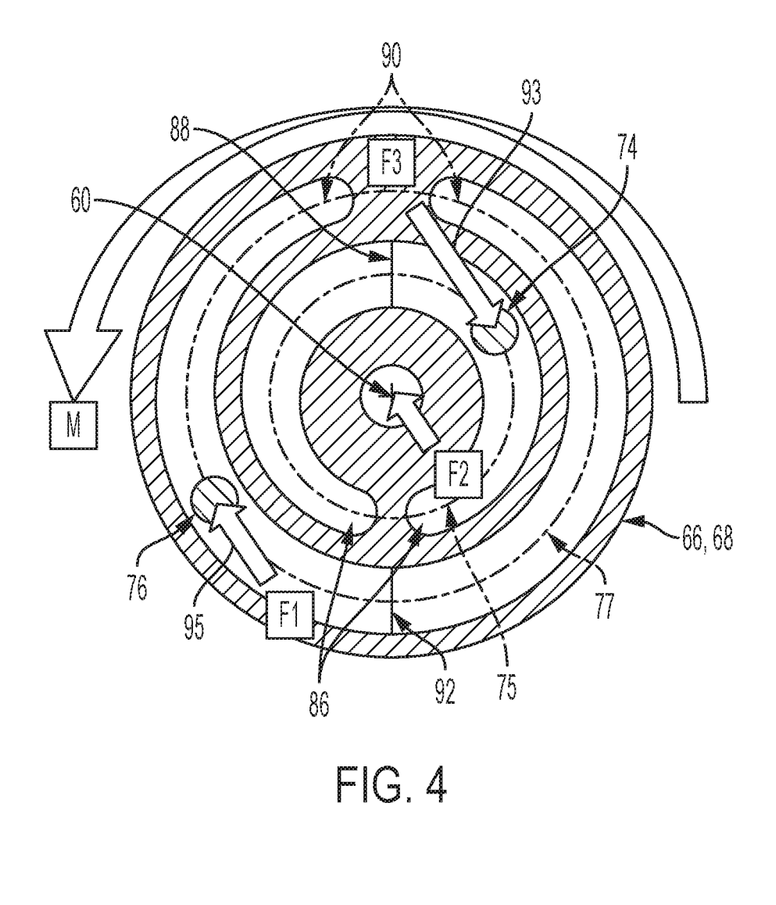
FIG. 4 is a top plan view, in cross-section, illustrating an example of a track configuration for a first plate and a second plate of the column assembly of FIG. 2.

FIG. 4 illustrates an example of a configuration for the inner tracks 75 and the outer tracks 77 of each of the first plate 66 and the second plate 68. The description of FIG. 4 is directed to inner tracks 75 and outer tracks 77 of the embodiment shown in FIG. 3A, but it is to be understood that the illustration and associated description also describes the inner tracks of FIG. 3B (114, 124, 123, 129) and the outer tracks (110, 122, 190, 196) of FIG. 3B.

Each of the inner tracks 75 and the outer tracks 77 may extend about the central axis 60. Each of the inner tracks 75 and the outer tracks 77 may be defined by each of first plate 66 and the second plate 68 and oriented to face one another. Each of the inner tracks 75 and the outer tracks 77 may be structured to define an elevation change along a respective track. For example, each of the inner tracks 75 may define a pair of first elevation regions 86 and a second elevation region 88 such that a pair of ramps is defined each increasing in elevation from one of the first elevation regions 86 (e.g. bases of ramps) to the second elevation region 88 (e.g. peak of ramps). Each of the pair of first elevation regions 86 may define a length relative to the column axis 60 different than a length defined by the second elevation region 88 relative to the column axis 60.

Each of the outer tracks 77 may define a pair of third elevation regions 90 and a fourth elevation region 92 such that a pair of ramps is defined each increasing in elevation from one of the third elevation regions 90 (e.g. bases of ramps) to the fourth elevation region 92 (e.g. peak of ramps). Each of the pair of third elevation regions 90 may define a length relative to the column axis 60 different than a length of the fourth elevation region 92 relative to the column axis 60.

Figure 5:
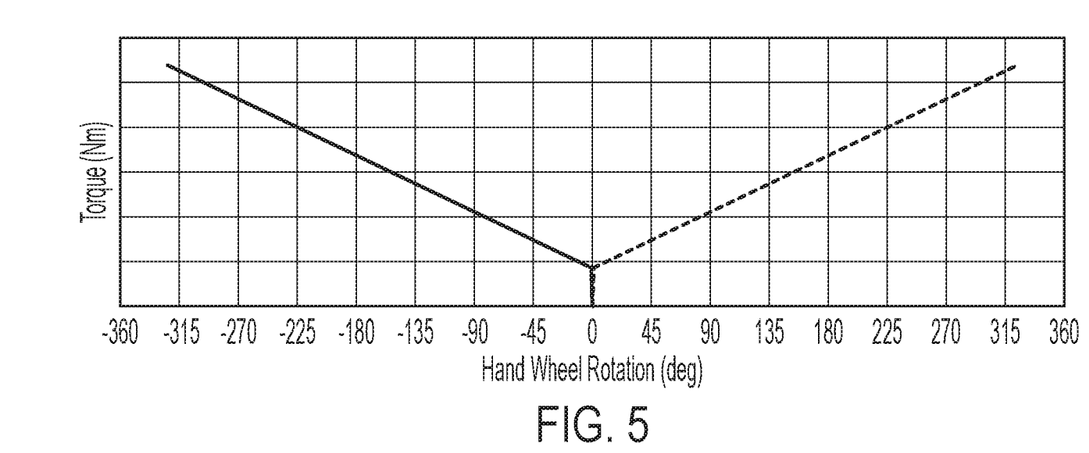
FIG. 5 illustrates a plot of torque vs. angular displacement for a constant slope elevation change of the track of FIG. 4.
Figure 6:
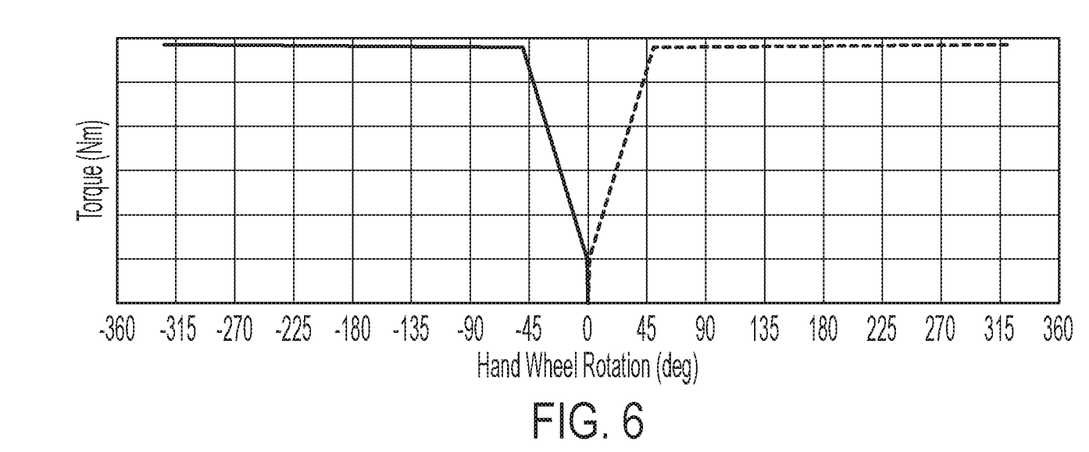
FIG. 6 illustrates a plot of torque vs. angular displacement for a non-constant elevation change of the track of FIG. 4.

One or both of the tracks 75, 77 may have an elevation change (i.e., ramp profile) that is linear in some embodiments, such that the slope change is substantially constant between the lowest and highest elevation locations. However, in other embodiments, one or both of the tracks 75, 77 have an elevation change that is non-linear, such that the slope change is not substantially constant between the lowest and highest elevation locations. It is to be further appreciated that one or both of the tracks 75, 77 may have elevation changes that include a combination of linear and non-linear portions. The particular ramp profile will be based on the desired characteristics of the particular application of use. For example, FIG. 5 illustrates a plot of torque over a range of handwheel rotation travel for a linear elevation change. This configuration provides a single linear spring rate over the entire range of travel. Alternatively, one example of a non-linear elevation change is shown in FIG. 6. The varied elevation change provides distinct tunable spring rate zones.

The inner track 75 and the outer track 77 may be arranged with one another to define a bi-directional relationship of track ball travel within respective tracks. For example, the inner tracks 75 may be structured such that the elevation change of each of the inner tracks 75 generates a force against the first ball 74 as represented by force arrow 93. The outer tracks 77 may be structured such that the elevation change of each of the outer tracks 77 generates a force against the second ball 76 as represented by force arrow 95.

Figure 7:
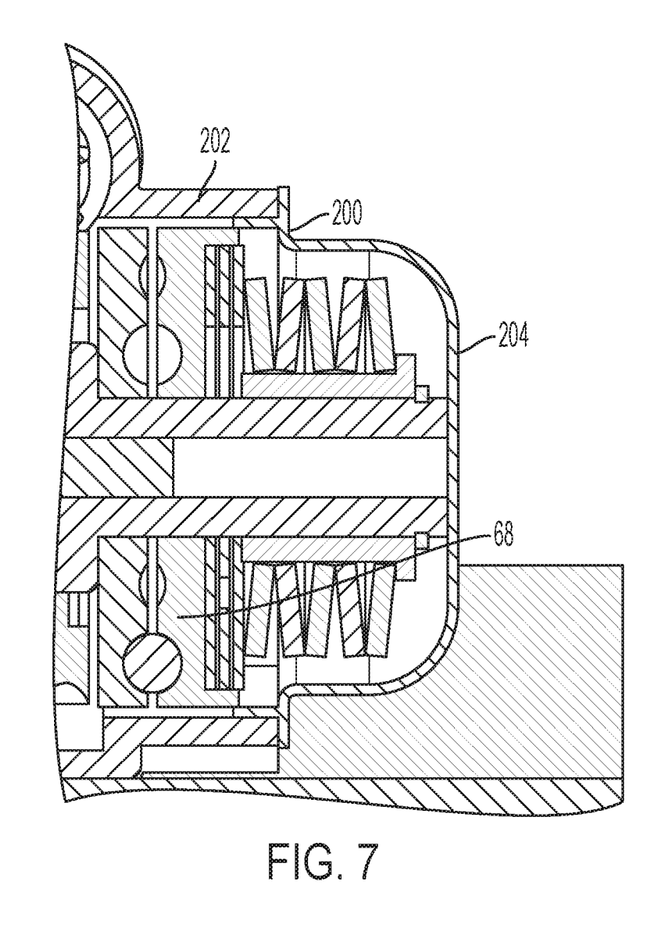
FIG. 7 is a side view, in cross-section, illustrating an example of the column assembly with a rotational travel stop.
Figure 7A:
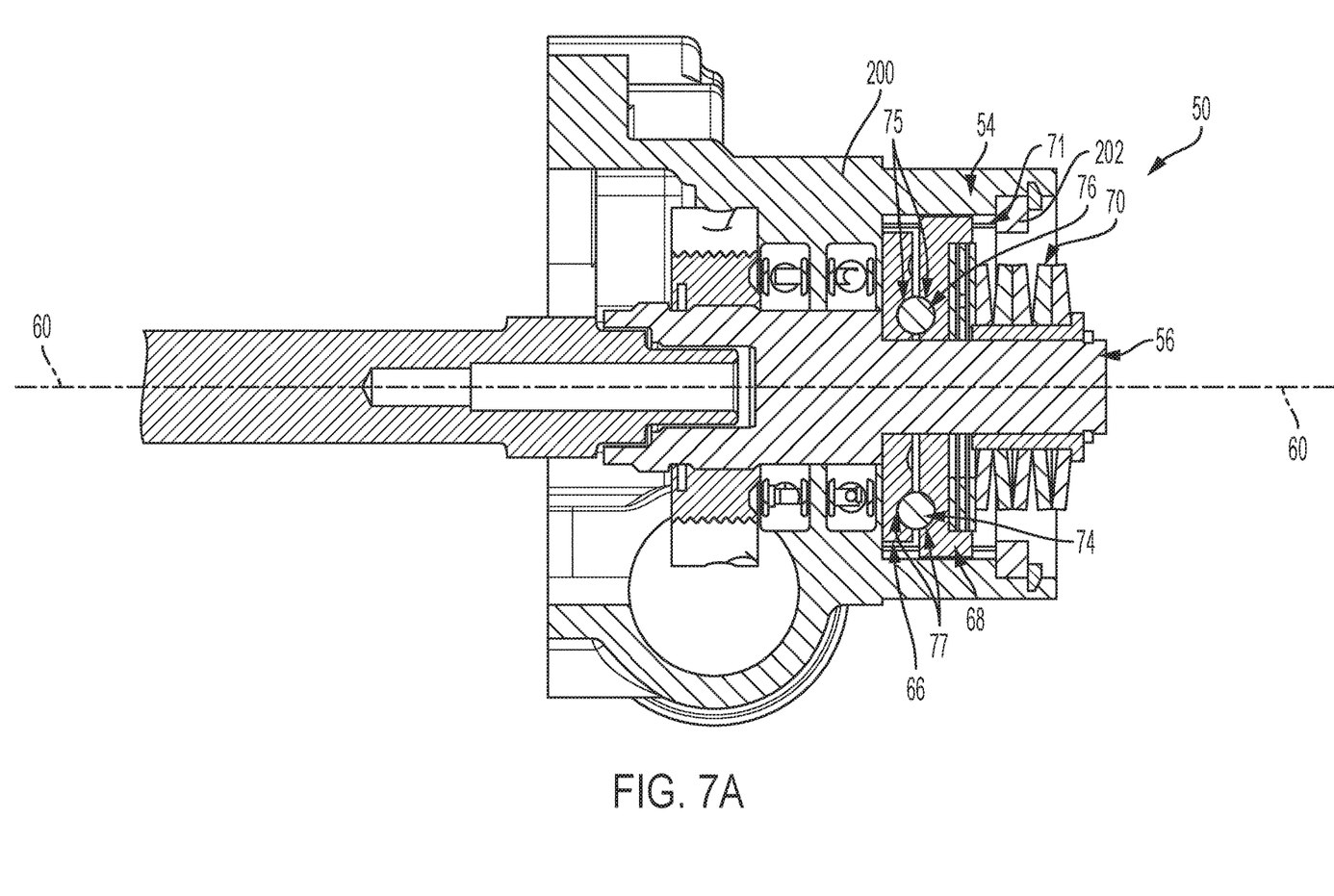
FIG. 7A is a side view, in cross-section, illustrating another example of the rotational travel stop.

Referring now to FIG. 7, any of the embodiments disclosed herein may be provided with an end stop 200 that limits rotational travel of the steering column. The end stop 200 is any feature that protrudes radially inwardly from the actuator assembly housing 202 that blocks axial travel of the plate that is free to translate axially. In the embodiment of FIG. 3A, the second plate 68 is the plate that is positioned to contact the end stop 200. In the embodiment of FIG. 3B, the third plate 108 is the plate that is positioned to contact the end stop 200. Additionally, as shown in the illustrated embodiment, an end cap 204 may be secured to the housing 202, where the end cap 204 includes a portion that functions as the end stop 200. The end stop 200 may extend completely circumferentially as a single wall or may be one or more radially inwardly extending protrusions. FIG. 7A illustrates an embodiment of the end stop 200 that protrudes from the housing 202 itself, avoiding the need for an end cap.

The end stop 200 is axially spaced from the applicable plate 68 or 108—when the plate is in the centered position—to provide a controlled clearance that corresponds to a degree of rotational travel of the steering wheel in either direction. The clearance can be defined to provide a desired limit on the degree of rotational travel.

The embodiments disclosed herein provide a mechanical torque that return the steering column—and steering wheel—to a centered position in the event of an electrical failure. Additionally, during normal operation of the actuator assembly, the mechanical assistance facilitates the implementation of a lower power motor, thereby providing a cost savings for the system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various

Having thus described the invention, it is claimed:

1. A steering system comprising:
   a steering column for orientation in at least a center position and a second position and defining a central axis;
   an actuator assembly in operative communication with the steering column to provide steering assistance, the actuator assembly including a pair of plates, each plate defining an aperture for the steering column to extend therethrough and each plate including an outer track and an inner track disposed radially inward of the outer track relative to the central axis;
   a first ball for disposal within the outer tracks;
   a second ball for disposal within the inner tracks, the pair of plates arranged such that the outer tracks and the inner tracks of each of the pair of plates face one another; and
   a spring element arranged with the actuator assembly to bias movement of the second plate in an axial direction along the central axis,
   wherein each of the outer tracks and each of the inner tracks define a ramp region, each of the ramp regions are arranged with the spring element to influence a rotation of the steering column to return to the center position,
   wherein the inner tracks and the outer tracks have respective elevation changes along each of the ramp regions and are arranged with one another to define a bi-directional relationship of ball travel within the tracks.

2. The system of claim 1, wherein the ramp regions are arranged with one another to facilitate the rotational influence based on a bias of only the spring element.

3. The system of claim 1, wherein the spring element is arranged with the second plate such that each of the balls is influenced to move to a lowest point of a respective ramp region.

4. The system of claim 1, wherein the ramp region of at least one of the inner and outer tracks consists of a constant elevation change.

5. The system of claim 1, wherein the ramp region of at least one of the inner and outer tracks includes a non-constant elevation change.

6. The system of claim 1, further comprising a housing of the actuator assembly, the housing having a travel stop feature protruding radially inwardly, the travel stop feature axially spaced from the second plate to define a rotational travel limit for the steering column.

7. The system of claim 1, further comprising a housing of the actuator assembly and an end cap operatively coupled to the housing, wherein a portion of the end cap defines a travel stop feature axially spaced from the second plate to define a rotational travel limit for the steering column.

8. The system of claim 1, wherein the first plate is fixed to the steering column, is free to rotate with the steering column and is axially fixed along the central axis of the steering column, wherein the second plate is free to translate axially along the central axis and is rotationally fixed with a protrusion disposed in a keyway of a housing of the actuator assembly.

9. A steering system comprising:
   a steering column for orientation in at least a center position and a second position and defining a central axis;
   an actuator assembly in operative communication with the steering column to provide steering assistance, the actuator assembly comprising at least three plates defined by a first end plate, a second end plate and at least one intermediate plate, each of the plates defining an aperture for the steering column to extend therethrough, wherein each adjacent set of plates includes a respective outer track facing each other and a respective inner track facing each other disposed radially inward of the outer track relative to the central axis;
   an outer ball disposed within each of the respective outer tracks of each adjacent set of plates;
   an inner ball disposed within each of the respective inner tracks of each adjacent set of plates; and
   a spring element arranged with the actuator assembly to bias movement of the second end plate in an axial direction along the central axis,
   wherein each of the outer tracks and each of the inner tracks define a ramp region, each of the ramp regions are arranged with the spring element to influence a rotation of the steering column to return to the center position,
   wherein the inner tracks and the outer tracks have respective elevation changes along each of the ramp regions and are arranged with one another to define a bi-directional relationship of ball travel within the tracks.

10. The system of claim 9, wherein the spring element is arranged with the second end plate such that each of the balls is influenced to move to a lowest point of a respective ramp region.

11. The system of claim 9, wherein the ramp region of at least one of the inner and outer tracks consists of a constant elevation change.

12. The system of claim 9, wherein the ramp region of at least one of the inner and outer tracks includes a non-constant elevation change.

13. The system of claim 9, further comprising a housing of the actuator assembly, the housing having a travel stop feature protruding radially inwardly, the travel stop feature axially spaced from the second end plate to define a rotational travel limit for the steering column.

14. The system of claim 9, further comprising a housing of the actuator assembly and an end cap operatively coupled to the housing, wherein a portion of the end cap defines a travel stop feature axially spaced from the second end plate to define a rotational travel limit for the steering column.

15. The system of claim 9, wherein the first end plate is fixed to the steering column, is free to rotate with the steering column and is axially fixed along the central axis of the steering column, wherein the second end plate is free to translate axially along the central axis and is rotationally fixed with a protrusion disposed in a keyway of a housing of the actuator assembly.

* * * * *